(12) United States Patent
Lim et al.

(10) Patent No.: US 11,252,424 B2
(45) Date of Patent: Feb. 15, 2022

(54) METHOD AND DEVICE FOR DETERMINING REFERENCE UNIT

(71) Applicant: Electronics and Telecommunications Research Institute, Daejeon (KR)

(72) Inventors: Sung Chang Lim, Daejeon (KR); Hui Yong Kim, Daejeon (KR); Se Yoon Jeong, Dajeon (KR); Suk Hee Cho, Daejeon (KR); Jong Ho Kim, Daejeon (KR); Ha Hyun Lee, Seoul (KR); Jin Ho Lee, Daejeon (KR); Jin Soo Choi, Daejeon (KR); Jin Woong Kim, Daejeon (KR); Chie Teuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/535,991

(22) Filed: Aug. 8, 2019

(65) Prior Publication Data
US 2019/0364292 A1 Nov. 28, 2019

Related U.S. Application Data

(63) Continuation of application No. 15/011,090, filed on Jan. 29, 2016, now Pat. No. 10,425,653, which is a
(Continued)

(30) Foreign Application Priority Data

Dec. 13, 2010 (KR) ........................ 10-2010-0126630
Dec. 13, 2011 (KR) ........................ 10-2011-0133709

(51) Int. Cl.
*H04N 19/44* (2014.01)
*H04N 19/52* (2014.01)
(Continued)

(52) U.S. Cl.
CPC ............. *H04N 19/44* (2014.11); *H04N 19/50* (2014.11); *H04N 19/503* (2014.11); *H04N 19/52* (2014.11); *H04N 19/597* (2014.11)

(58) Field of Classification Search
CPC ...... H04N 19/44; H04N 19/52; H04N 19/503; H04N 19/50; H04N 19/597; H04N 19/105; H04N 19/109; H04N 19/51
See application file for complete search history.

(56) References Cited

U.S. PATENT DOCUMENTS

| 5,796,434 A | 8/1998 | Lempel |
| 6,567,469 B1 | 5/2003 | Rackett |

(Continued)

FOREIGN PATENT DOCUMENTS

| CN | 101005614 A | 7/2007 |
| CN | 101175210 A | 5/2008 |

(Continued)

OTHER PUBLICATIONS

A. Beric et al. "A technique for reducing complexity of recursive motion estimation algorithms," Proceedings of the 2003 IEEE Workshop on Signal Processing Systems (SIPS 2003), 2003, pp. 195-200, conference held Aug. 27-29, 2003, Seoul, Republic of Korea.

(Continued)

*Primary Examiner* — Tracy Y. Li
(74) *Attorney, Agent, or Firm* — Michael Best & Friedrich LLP

(57) ABSTRACT

An inter prediction method according to the present invention comprises the steps of: selecting candidate units from among reconstructed neighbor units; creating a candidate unit set with respect to units to be decoded, using the selected candidate units; determining a reference unit from among the candidate units which constitute the created
(Continued)

candidate unit set; and performing inter prediction on the units to be decoded, using the determined reference unit. According to the present invention, image encoding/decoding efficiency can be improved.

3 Claims, 17 Drawing Sheets

Related U.S. Application Data continuation of application No. 13/991,243, filed as application No. PCT/KR2011/009598 on Dec. 13, 2011, now Pat. No. 9,288,491.

(51) Int. Cl.
*H04N 19/503* (2014.01)
*H04N 19/50* (2014.01)
*H04N 19/597* (2014.01)

(56) References Cited

U.S. PATENT DOCUMENTS

| | | | |
|---|---|---|---|
| 2004/0028282 | A1 | 2/2004 | Kato et al. |
| 2004/0052507 | A1* | 3/2004 | Kondo ............... H04N 19/137 386/329 |
| 2004/0057515 | A1 | 3/2004 | Koto et al. |
| 2004/0252768 | A1* | 12/2004 | Suzuki ............... H04N 19/463 375/240.24 |
| 2005/0123206 | A1 | 6/2005 | Sakai et al. |
| 2007/0122123 | A1 | 5/2007 | Nakagawa |
| 2007/0177674 | A1 | 8/2007 | Yang |
| 2008/0043845 | A1 | 2/2008 | Nakaishi |
| 2008/0049845 | A1 | 2/2008 | Liu |
| 2008/0080617 | A1 | 4/2008 | Kodama |
| 2009/0257492 | A1 | 10/2009 | Andersson et al. |
| 2009/0304084 | A1 | 12/2009 | Hallapuro et al. |
| 2010/0080296 | A1 | 4/2010 | Lee et al. |
| 2010/0118969 | A1 | 5/2010 | Kondo et al. |
| 2010/0135581 | A1 | 6/2010 | Baik et al. |
| 2010/0195723 | A1 | 8/2010 | Ikai et al. |
| 2010/0246684 | A1 | 9/2010 | Naito et al. |
| 2010/0284460 | A1* | 11/2010 | Tsai ............... H04N 19/61 375/240.12 |
| 2011/0038554 | A1 | 2/2011 | Lee et al. |
| 2011/0080954 | A1 | 4/2011 | Bossen et al. |
| 2011/0176612 | A1* | 7/2011 | Tsai ............... H04N 19/172 375/240.16 |
| 2011/0206117 | A1 | 8/2011 | Bivolarsky et al. |
| 2012/0008676 | A1 | 1/2012 | Lee et al. |
| 2012/0008688 | A1 | 1/2012 | Tsai et al. |
| 2012/0056981 | A1 | 3/2012 | Tian et al. |
| 2012/0128060 | A1 | 5/2012 | Lin et al. |
| 2014/0037001 | A1 | 2/2014 | Lim et al. |
| 2014/0126643 | A1 | 5/2014 | Park et al. |

FOREIGN PATENT DOCUMENTS

| | | |
|---|---|---|
| CN | 101193302 A | 6/2008 |
| CN | 101340585 A | 1/2009 |
| CN | 101371571 A | 2/2009 |
| CN | 101601299 A | 12/2009 |
| CN | 101609681 A | 12/2009 |
| CN | 101617538 A | 12/2009 |
| CN | 101647281 A | 2/2010 |
| CN | 101815218 A | 8/2010 |
| CN | 101867823 A | 10/2010 |
| CN | 101884219 A | 11/2010 |
| EP | 2200323 A1 | 6/2010 |
| EP | 2557796 A2 | 2/2013 |
| JP | 6-165164 A | 6/1994 |
| JP | 7-170496 A | 7/1995 |
| JP | 2007-124614 A | 5/2007 |
| JP | 2008-109632 A | 5/2008 |
| JP | 2008-535424 A | 8/2008 |
| JP | 2008-283490 A | 11/2008 |
| JP | 2010-158049 A | 7/2010 |
| JP | 2010-246144 A | 10/2010 |
| JP | 2010-252395 A | 11/2010 |
| JP | 2010-258927 A | 11/2010 |
| JP | 5192393 B2 | 5/2013 |
| JP | 2013-530660 A | 7/2013 |
| KR | 10-2007-0037531 A | 4/2007 |
| KR | 10-2009-0058954 A | 6/2009 |
| KR | 10-2010-0018810 A | 2/2010 |
| KR | 10-1210892 B1 | 12/2012 |
| KR | 10-1228020 B1 | 1/2013 |
| WO | WO 2006/106039 A1 | 10/2006 |
| WO | WO 2008/041300 A1 | 4/2008 |
| WO | WO 2008/127597 A2 | 10/2008 |
| WO | WO 2009/115901 A2 | 9/2009 |
| WO | WO 2009/115901 A3 | 9/2009 |
| WO | WO 2010/029850 A1 | 3/2010 |
| WO | WO 2012/005549 A2 | 1/2012 |
| WO | WO 2012/005549 A3 | 1/2012 |

OTHER PUBLICATIONS

Chinese Office Action dated Jul. 16, 2019 in counterpart Chinese Office Action 201710081302.X (9 pages in English).

F. Bossen et al. "Simplified motion vector coding method," Document JCTVC-B904, Joint Collaborative Team on Video Coding (JCT-VC) of ITU-T SG16 WP3 and ISO/IEC JTC1/SC29/WG11, 2nd Meeting, Geneva, Switzerland, Jul. 21-28, 2010 (5 pages).

Houjie BI, Posts & Telecom Press, "A New Generation of Video Compression Encoding Standard—H.264/AVC", *Baidu Academic*, May 31, 2005 (1 page in English and 326 pages in Chinese).

J. Lainema et al., "Improved Motion Vector Prediction for TML-4", Proceeding from the Eleventh Meeting of ITU-Telecommunications Standardization Sector, Study Group 16, Video Coding Experts Group, held at Portland, Oregon, on Aug. 22-25, 2000 (2 pages, in English).

K. McCann et al., "Samsung's Response to the Call for Proposals on Video Compression Technology", Proceedings from the 1$^{st}$ Meeting of Joint Collaborative Team on Video Coding (JCT-VC) of ITU-T SG16 WP3 and ISO/IEC JTC1/SC29/WG11, Document: JCTVC-A124, held at Dresden, Germany, on Apr. 15-23, 2010, pp. 1-42.

K. McCann et al., "Samsung's Response to the Call for Proposals on Video Compression Technology", Proceedings from the 1st Meeting of Joint Collaborative Team on Video Coding (JCT-VC) of ITU-T SG16 WP3 and ISO/IEC JTC1/SC29/WG11, Document: JCTVC-A124, held at Dresden, Germany, on Apr. 15-23, 2010, pp. 1-52 (52 pages, in English).

Park, J., et al., "CE9 Subtests N and O: Improvement on AMVP," 5th Meeting on Joint Collaborative Team on Video Coding (JCT-VC) of ITU-T SG16 WP3 and ISO/IEC JTC1/SC29/WG11, held on Mar. 16-23, 2011 in Geneva, Switzerland, document No. JCTVC-E350 (pp. 1-5).

Wiegand, Thomas et al., "WD2: Working Draft 2 of High-Efficiency Video Coding", *Joint Collaborative Team on Video Coding (JCT-VC) of ITU-T SG16 WP3 and ISO/IEC JTC1/SC29/WG11*, 4th Meeting: Daegu, Republic of Korea, Jan. 20-38, 2011 (5 pages in English).

Yu, Yue et al., "The Improvements on Reference Picture Buffering and List Construction", *Joint Collaborative Team on Video Coding (JCT-VC) of ITU-T SG16 WP3 and ISO/IEC JTC1/SC29/WG11*, 4th Meeting: Geneva, CH, Nov. 21-30, 2011 (11 pages in English).

Laroche, Guillaume et al., "RD Optimized Coding for Motion Vector Predictor Selection", *IEEE Transactions on Circuits and Systems for Video Technology*, vol. 18, Issue 9, Sep. 2008 (pp. 1247-1257).

Wiegand, Thomas et al. "Long-Term Memory Motion-Compensated Prediction." *IEEE transactions on circuits and systems for video technology*vol. 9 issue 1 (Feb. 1999) (15 pages in English).

(56) References Cited

OTHER PUBLICATIONS

Wiegand, Thomas, et al. "Overview of the H. 264/AVC Video Coding Standard." *IEEE Transactions on Circuits and Systems for Video Technology*, vol. 13 Issue 7 (Jul. 2003) (17 pages in English).

* cited by examiner

=== PAGE 1 ===

METHOD AND DEVICE FOR DETERMINING REFERENCE UNIT

CROSS-REFERENCE TO RELATED APPLICATIONS

This application is a continuation of U.S. application Ser. No. 15/011,090, filed on Jan. 29, 2016, now U.S. Pat. No. 10,425,653, issued Sep. 24, 2019, which is a continuation of U.S. application Ser. No. 13/991,243, having a 371(c) date of Jun. 3, 2013, now U.S. Pat. No. 9,288,491, issued Mar. 15, 2016, which is a U.S. national stage application of International Application No. PCT/KR2011/009598, filed on Dec. 13, 2011, which claims the benefit of Korean Application No. 10-2010-0126630, filed on Dec. 13, 2010 and Korean Application No. 10-2011-0133709, filed on Dec. 13, 2011, in the Korean Intellectual Property Office, the entire disclosures of which are incorporated herein by reference for all purposes.

TECHNICAL FIELD

The present invention relates to image processing, and more particularly, to an inter prediction method and apparatus.

BACKGROUND ART

Recently, in accordance with the expansion of broadcasting services having high definition (HD) resolution in the country and around the world, many users have been accustomed to a high resolution and definition image, such that many organizations have attempted to develop the next-generation video devices. In addition, as the interest in HDTV and ultra high definition (UHD) having a resolution four times higher than that of HDTV have increased, a compression technology for a higher-resolution and higher-definition image has been demanded.

For picture compression, an inter prediction technology of predicting pixel values included in a current picture from a picture before and/or after the current picture, an intra prediction technology of predicting pixel values included in a current picture using pixel information in the current picture, an entropy coding technology of allocating a short code to symbols having a high appearance frequency and a long code to symbols having a low appearance frequency, or the like, may be used.

DISCLOSURE

Technical Problem

The present invention provides a video encoding method and apparatus capable of improving video encoding/decoding efficiency.

The present invention also provides a video decoding method and apparatus capable of improving video encoding/decoding efficiency.

The present invention also provides an inter prediction method and apparatus capable of improving video encoding/decoding efficiency.

The present invention also provides a method and apparatus for determining a reference unit capable of improving video encoding/decoding efficiency.

Technical Solution

In an aspect, an inter prediction method is provided. The inter prediction method includes: selecting candidate units among reconstructed neighboring units; generating a candidate unit set for a decoding target unit using the selected candidate units; determining a reference unit among the candidate units configuring the generated candidate unit set; and performing inter prediction on the decoding target unit using the determined reference unit, wherein the reconstructed neighboring units include an upper neighboring unit adjacent to an upper portion of the decoding target unit, a left neighboring unit adjacent to the left of the decoding target unit, a right upper corner unit positioned at a right upper corner of the decoding target unit, a left upper corner unit positioned at a left upper corner of the decoding target unit, and a left lower corner unit positioned at a left lower corner of the decoding target unit.

In the selecting of the candidate units, the upper neighboring unit, the left neighboring unit, the right upper corner unit, the left upper corner unit, and the left lower corner unit may be selected as the candidate units.

In the selecting of the candidate units, the upper neighboring unit and the left neighboring unit may be selected as the candidate units.

In the selecting of the candidate units, units of which lengths of boundaries adjacent to the decoding target unit are a predetermined threshold value or more among the reconstructed neighboring units may be selected as the candidate units.

In the selecting of the candidate units, units having a size of a predetermined threshold value or more among the reconstructed neighboring units may be selected as the candidate units.

In the selecting of the candidate units, units having a depth value of a predetermined threshold value or less among the reconstructed neighboring units may be selected as the candidate units.

In the selecting of the candidate units, the candidate units may be selected based on relative lengths between boundaries in which the reconstructed neighboring units are adjacent to the decoding target unit, relative sizes between the reconstructed neighboring units, or relative depth values between the reconstructed neighboring units.

In the selecting of the candidate units, the candidate units may be selected using at least one of an encoding parameter of the decoding target unit and encoding parameters of the reconstructed neighboring units, wherein each of the encoding parameter of the decoding target unit and the encoding parameters of the reconstructed neighboring units includes at least one of a motion vector, a reference picture list, a reference picture index, a prediction direction, and a motion vector predictor.

A first encoding parameter of the decoding target unit may include a first reference picture list and a first reference picture index, and the selecting of the candidate units may include selecting units having a second encoding parameter as the candidate units, wherein the second encoding parameter includes at least one of a second reference picture list that is the same as the first reference picture list and a second reference picture index that is the same as the first reference picture index.

In the selecting of the candidate units, units having the same reference picture as a reference picture of the decoding target unit may be selected as the candidate units. In the selecting of the candidate units, only units encoded by the inter prediction may be selected as the candidate units.

In the generating of the candidate unit set, the candidate unit set may be generated using both of the selected candidate units and collocate units, wherein the collocated units are units positioned at the same spatial position as that of the decoding target unit among units in a reference picture for the decoding target unit.

In the selecting of the candidate units, units having a predetermined fixed number may be selected as the candidate units.

The units having the predetermined fixed number may be selected based on the sameness between an encoding parameter of the decoding target unit and encoding parameters of the reconstructed neighboring units, wherein each of the encoding parameter of the decoding target unit and the encoding parameters of the reconstructed neighboring units includes at least one of a motion vector, a reference picture list, a reference picture index, a prediction direction, and a motion vector predictor.

The units having the predetermined fixed number may be selected based on the sameness between a reference picture of the decoding target unit and reference pictures of the reconstructed neighboring units.

The selecting of the candidate units may include: receiving an encoding parameter identifier; decoding the received encoding parameter identifier; and selecting the candidate units based on an encoding parameter value allocated to the decoded encoding parameter identifier, wherein the encoding parameter value allocated to the decoded encoding parameter identifier is at least one of lengths of boundaries in which the reconstructed neighboring units are adjacent to the decoding target unit, sizes of the reconstructed neighboring units, and depth values between the reconstructed neighboring units.

The determining of the reference unit may include: receiving a reference unit identifier; decoding the received reference unit identifier; and determining the reference unit using the decoded reference unit identifier, wherein the reference unit identifier is an identifier indicating a unit determined as the reference unit among the candidate units configuring the candidate unit set.

The higher the probability that the unit indicated by the reference unit identifier is determined as the reference unit, the shorter the length of a codeword allocated to the reference unit identifier may be.

The generating of the candidate unit set may include: arranging the candidate units according to a sequence in which the probabilities that the candidate units are determined as the reference unit are high, and in the determining of the reference unit, a first unit among the arranged candidate units may be determined as the reference unit.

In the generating of the candidate unit set, only a single unit having highest probability to be determined as the reference unit among the candidate units may be included in the candidate unit set, and in the determining of the reference unit, the single unit included in the candidate unit set may be determined as the reference unit.

Advantageous Effects

With the video encoding method according to the exemplary embodiment of the present invention, video encoding/decoding efficiency may be improved.

With the video decoding method according to the exemplary embodiment of the present invention, video encoding/decoding efficiency may be improved.

With the inter prediction method according to the exemplary embodiment of the present invention, video encoding/decoding efficiency may be improved.

With the method for determining a reference unit according to the exemplary embodiment of the present invention, video encoding/decoding efficiency may be improved.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc., can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention.

Furthermore, constitutional parts shown in the embodiments of the present invention are independently shown so as to represent different characteristic functions. Thus, it does not mean that each constitutional part is constituted in a constitutional unit of separated hardware or one software. In other words, each constitutional part includes each of enumerated constitutional parts for convenience of explanation. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
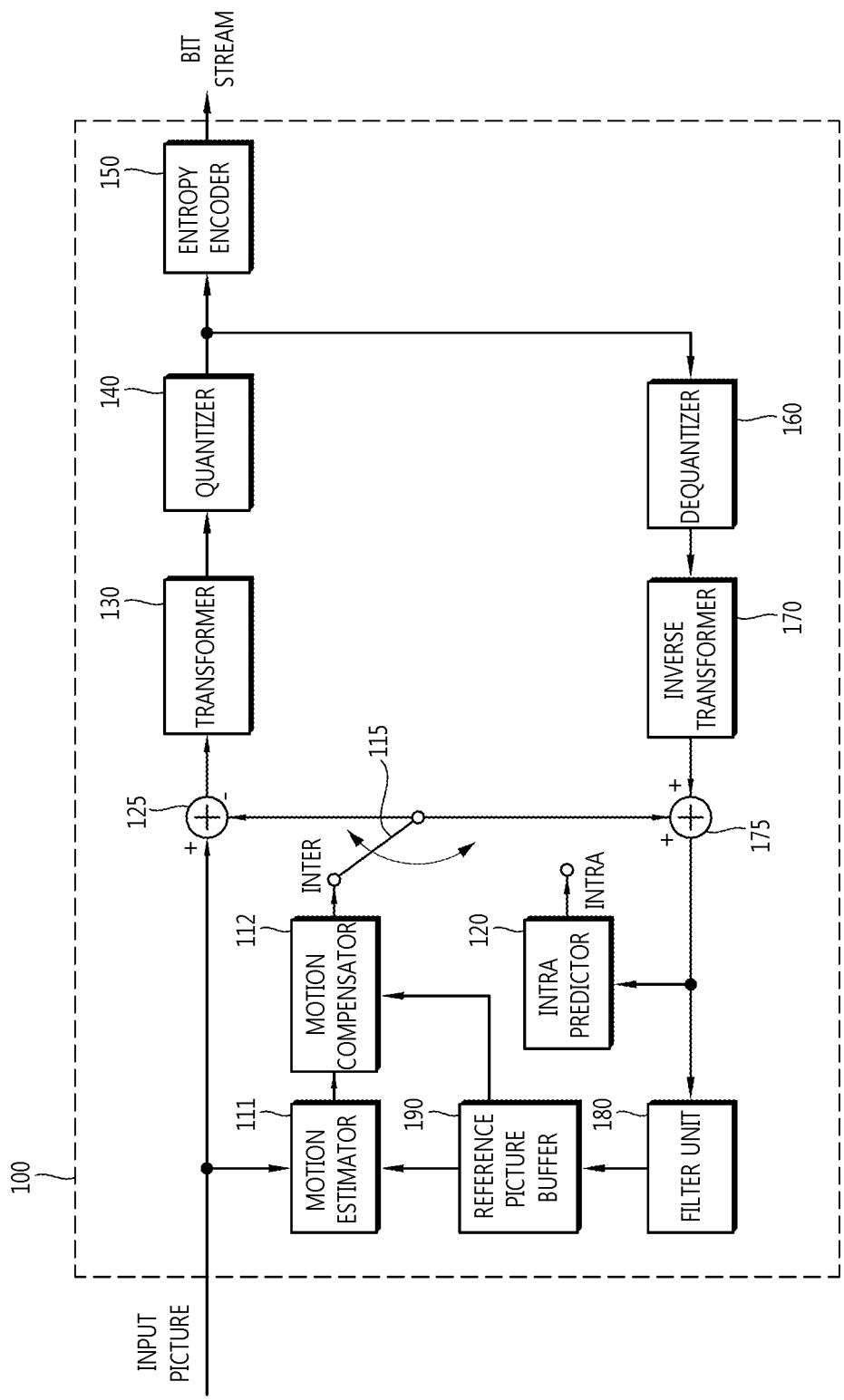
FIG. 1 is a block diagram showing a configuration of a video encoding apparatus according to an exemplary embodiment of the present invention.

FIG. 1 is a block diagram showing a configuration of a video encoding apparatus according to an exemplary embodiment of the present invention.

Referring to FIG. 1, a video encoding apparatus 100 includes a motion estimator 111, a motion compensator 112, an intra predictor 120, a switch 115, a subtracter 125, a transformer 130, a quantizer 140, an entropy encoder 150, a dequantizer 160, an inverse transformer 170, an adder 175, a filter unit 180, and a reference picture buffer 190.

The video encoding apparatus 100 may perform encoding on input pictures in an intra-mode or an inter-mode and output bit streams. The intra prediction means intra-picture prediction and the inter prediction means inter-picture prediction. In the case of the intra mode, the switch 115 may be switched to intra and in the case of the inter mode, the switch 115 may be switched to inter. The video encoding apparatus 100 may generate a prediction block for an input block of the input pictures and then encode a residual between the input block and the prediction block.

In the case of the intra mode, the intra predictor 120 may perform spatial prediction using pixel values of blocks encoded in advance around a current block to generate the prediction block.

In the case of the inter mode, the motion estimator 111 may search a region optimally matched with the input block in a reference picture stored in the reference picture buffer 190 during a motion prediction process to obtain a motion vector. The motion compensator 112 may perform motion compensation using the motion vector to generate the prediction block. Here, the motion vector may be a two dimensional vector used for inter prediction and represent an offset between a current encoding/decoding target picture and the reference picture.

The subtracter 125 may generate a residual block by the residual between the input block and the generated prediction block. The transformer 130 may perform transform on the residual block to output transform coefficients. Further, the quantizer 140 may quantize the input transform coefficient according to quantization parameters to output a quantized coefficient.

The entropy encoder 150 may perform entropy encoding based on values calculated in the quantizer 140 or encoding parameter values, or the like, calculated during the encoding process to output bit streams.

When the entropy encoding is applied, symbols are represented by allocating a small number of bits to symbols having high generation probability and allocating a large number of bits to symbols having low generation probability, thereby making it possible to reduce a size of bit streams for the encoding target symbols. Therefore, the compression performance of the video encoding may be improved through the entropy encoding. The entropy encoder 150 may use an encoding method such as exponential golomb, context-adaptive variable length coding (CAVLC), context-adaptive binary arithmetic coding (CABAC), or the like, for the entropy encoding.

Since the video encoding apparatus according to the exemplary embodiment of FIG. 1 performs inter prediction encoding, that is, inter-picture prediction encoding, a current encoded picture needs to be decoded and stored in order to be used as a reference picture. Therefore, the quantized coefficient is dequantized in the dequantizer 160 and inversely transformed in the inverse transformer 170. The dequantized and inversely transformed coefficient is added to the prediction block through the adder 175, such that a reconstructed block is generated.

The reconstructed block passes through the filter unit 180 and the filter unit 180 may apply at least one of a deblocking filter, a sample adaptive offset (SAO), and an adaptive loop filter (ALF) to a reconstructed block or a reconstructed picture. The filter unit 180 may also be called an adaptive in-loop filter. The deblocking filter may remove block distortion generated at an inter-block boundary. The SAO may add an appropriate offset value to a pixel value in order to compensate an encoding error. The ALF may perform the filtering based on a comparison value between the reconstructed picture and the original picture. The reconstructed block passing through the filter unit 180 may be stored in the reference picture buffer 190.

Figure 2:
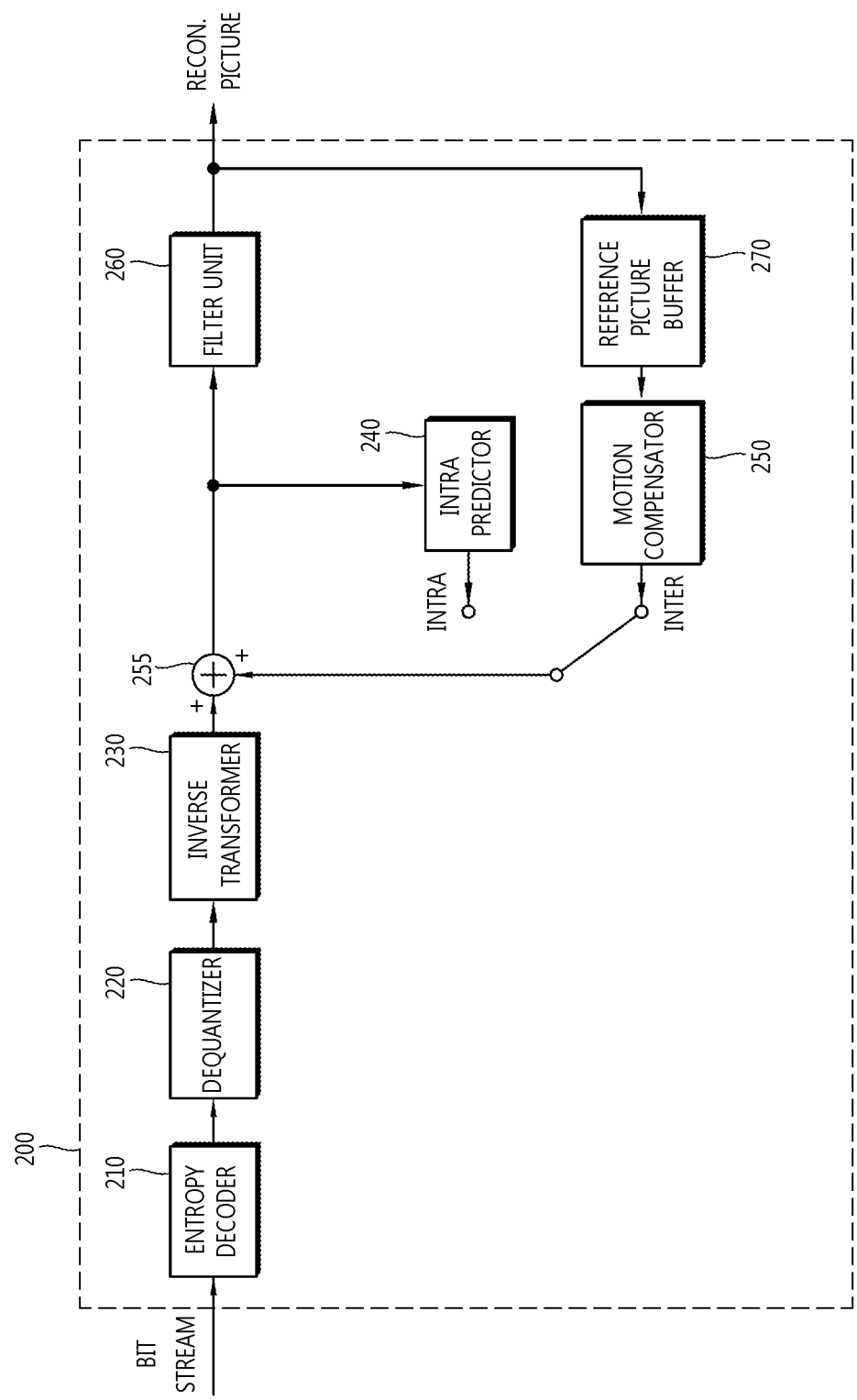
FIG. 2 is a block diagram showing a configuration of a video decoding apparatus according to an exemplary embodiment of the present invention.

FIG. 2 is a block diagram showing a configuration of a video decoding apparatus according to an exemplary embodiment of the present invention.

Referring to FIG. 2, a video decoding apparatus 200 includes an entropy decoder 210, a dequantizer 220, an inverse transformer 230, an intra predictor 240, a motion compensator 250, an adder 255, a filter unit 260, and a reference picture buffer 270.

The video decoding apparatus 200 may receive the bit streams output from the encoder to perform the decoding in the intra mode or the inter mode and output the reconstructed picture, that is, the reconstructed picture. In the case of the intra mode, the switch may be switched to the intra and in the case of the inter mode, the switch may be switched to the inter. The video decoding apparatus 200 may obtain a residual block from the received bit streams, generate the prediction block, and then add the residual block to the prediction block to generate the reconstructed block, that is, the reconstructed block.

The entropy decoder 210 may entropy-decode the input bit streams according to the probability distribution to generate symbols including a quantized coefficient type of symbols. The entropy decoding method is similar to the above-mentioned entropy encoding method.

When the entropy decoding method is applied, symbols are represented by allocating a small number of bits to symbols having high generation probability and allocating a large number of bits to symbols having low generation probability, thereby making it possible to reduce a size of bit streams for each symbol. Therefore, the video decoding compression performance may be improved through the entropy decoding method.

The quantized coefficients may be dequantized in the dequantizer 220 and be inversely transformed in the inverse transformer 230. The quantized coefficients are dequantized/inversely transformed, such that the residual block may be generated.

In the case of the intra mode, the intra predictor 240 may perform spatial prediction using pixel values of blocks encoded in advance around a current block to generate the prediction block. In the case of the inter mode, the motion compensator 250 may perform the motion compensation by using the motion vector and the reference picture stored in the reference picture buffer 270 to generate the prediction block.

The residual block and the prediction block may be added to each other through the adder 255 and the added block may pass through the filter unit 260. The filter unit 260 may apply at least one of the deblocking filter, the SAO, and the ALF to the reconstructed block or the reconstructed picture. The filter unit 260 may output the reconstructed pictures, that is, the reconstructed picture. The reconstructed picture may be stored in the reference picture buffer 270 to thereby be used for the inter prediction.

Hereinafter, a unit means a unit of picture encoding and decoding. At the time of the picture encoding and decoding, the encoding or decoding unit means the divided unit when the pictures are divided and encoded or decoded. Therefore, the encoding or decoding unit may be called a block, a coding unit (CU), a coding block, a prediction unit (PU), a prediction block, a transform unit (TU), a transform block, or the like. A single unit may be subdivided into a lower unit having a smaller size.

Here, the prediction unit means a basic unit that becomes a performance unit of prediction and/or motion compensation. The prediction unit may be divided into a plurality of partitions, and each of the partitions may also be called a prediction unit partition. When the prediction unit is divided into the plurality of partitions, each of the plurality of partitions may be a basic unit that becomes the performance unit of the prediction and/or the motion compensation. Hereinafter, in the exemplary embodiment of the present invention, each of the partitions divided from the prediction unit may also be called a prediction unit.

Meanwhile, as described above, in the inter mode, the encoder and the decoder may perform the prediction and/or the motion compensation on the encoding/decoding target unit. Here, the encoding/decoding target unit means the prediction unit and/or the prediction unit partitions. In this case, the encoder and the decoder may improve encoding/decoding efficiency by using a motion vector of reconstructed neighbor units. Here, the reconstructed neighboring units, which are units previously encoded or decoded to thereby be reconstructed, may include a unit adjacent to the encoding/decoding target unit, a unit positioned at a right upper corner of the encoding/decoding target unit, a unit positioned at a left upper corner of the encoding/decoding target unit, and/or a unit positioned at a left lower corner of the encoding/decoding target unit.

As an example, the encoder and the decoder may use the motion vectors of the reconstructed neighboring units as the motion vector of the encoding/decoding target unit. Here, since the motion vectors of the reconstructed neighboring units are used in the encoding/decoding target unit, the encoder may not encode the motion vector of the encoding/decoding target unit. Therefore, an amount of bits transmitted to the decoder may be reduced, and encoding efficiency may be improved. As this inter prediction mode, there are a skip mode, a direct mode, and the like.

Here, the encoder may use an identifier and/or an index indicating a motion vector of which of the reconstructed neighboring units is used. The inter prediction mode in which the identifier and/or the index is used may be called a merge mode.

As another example, when the encoder perform the prediction and/or the compensation using the motion vector of the encoding target unit and then encode the motion vector of the encoding target unit, it may generate a residual between the motion vector of the encoding target unit and the motion vectors of the reconstructed neighboring units. The encoder may encode the generated motion vector residual and transmit the encoded motion vector residual to the decoder. In this case, the decoder may decode the motion vector residual and derive the motion vector of the decoding target unit by summing up the decoded motion vector residual and the motion vectors of the reconstructed neighboring units. This inter prediction method may be called motion vector prediction (MVP). The MVP is used, such that an amount of information transmitted from the encoder to the decoder may be reduced and encoding efficiency may be improved.

Here, the encoder may use an identifier and/or an index indicating a motion vector of which of the reconstructed neighboring units is used. The MVP in which the identifier and/or the index are additionally used may also be called advanced motion vector prediction (AMVP).

In the case of the skip mode, the direct mode, the merge mode, the MVP, the AMVP, or the like, described above, a reference unit may be determined among the reconstructed neighboring units, and a motion vector of the determined reference unit may be used for prediction and motion compensation of a current encoding/decoding target unit. Hereinafter, the reference unit means a unit used for prediction and motion compensation of the encoding/decoding target unit. The encoder and the decoder may use an encoding parameter of the reference unit in the case of performing the inter prediction and/or the motion compensation on the current encoding/decoding target unit.

The encoding parameter may include information that may be inferred during an encoding or decoding process as well as information that is encoded in the encoder and transmitted to the decoder, such as a syntax element, and means information required when the picture is encoded or decoded. The encoding parameter may include, for example, values and/or statistics of an inter prediction mode, motion information, a coded block pattern (CBP), a block size, block division information, or the like.

Here, the motion information means a parameter required for inter prediction and motion compensation. The motion information may include at least one of a reference picture list, a reference picture index, a motion vector, a prediction direction, and a motion vector predictor. Here, the reference picture list is a list including a plurality of reference pictures used for the inter prediction, and the reference picture index is an index indicating reference pictures used for the inter prediction of the encoding/decoding target unit among the reference pictures included in the reference picture list.

In the case of the inter prediction, two reference picture lists may be used. One of the two reference picture lists may be called a reference picture list 0 and the other thereof may be called a reference picture list 1. The prediction direction included in the motion information may be information indicating which of the reference picture lists is used at the time of the inter prediction. That is, the prediction direction may indicate whether the reference picture list 0 is used, the reference picture list 1 is used, or both of the reference picture list 0 and the reference picture list 1 are used. The motion vector predictor means a unit that becomes a prediction candidate when the encoder and the decoder predict the motion vector and/or a motion vector of the unit that becomes the prediction candidate.

The block division information may include information on a depth of a unit. The depth information may indicate the number and/or the degree of unit divisions.

Figure 3:
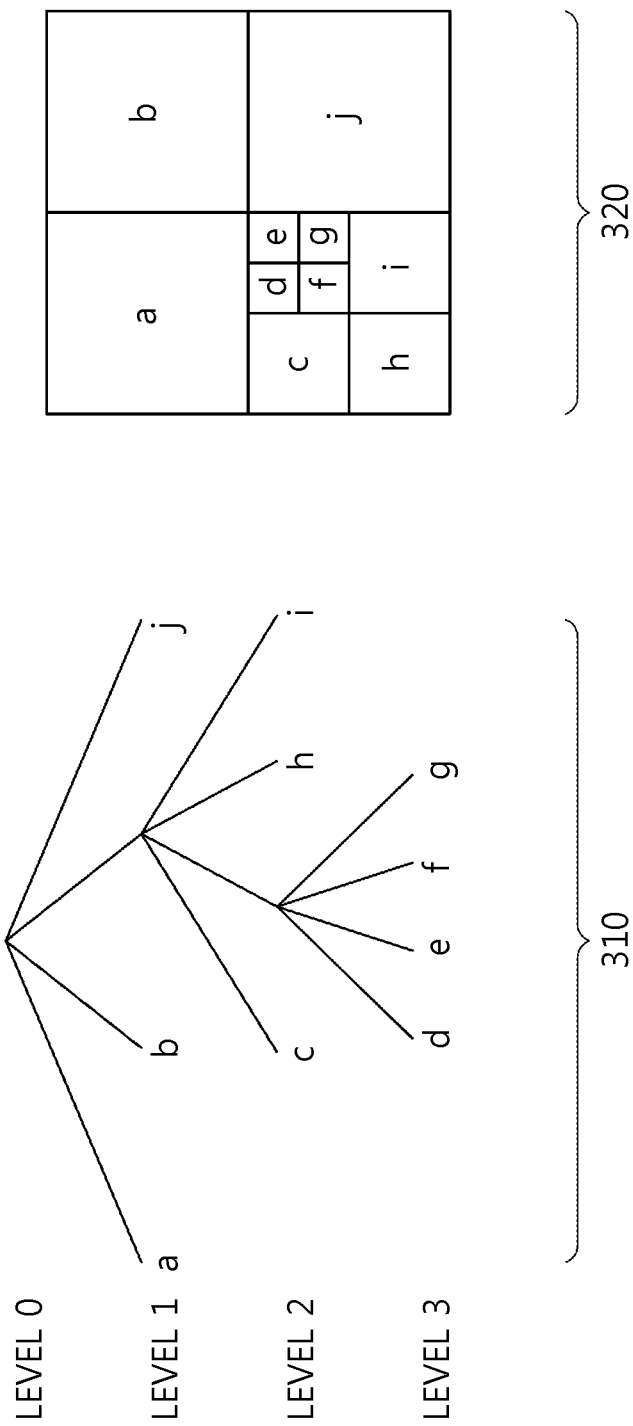
FIG. 3 is a conceptual diagram schematically showing an example in which a single unit is divided into a plurality of subunits.

FIG. 3 is a conceptual diagram schematically showing an example in which a single unit is divided into a plurality of subunits.

A single unit may be hierarchically divided using depth information based on a tree structure. The respective divided sub-units may have depth information. Since the depth information indicates the number and/or the degree of unit divisions, it may include information on a size of the sub-unit.

Referring to 310 of FIG. 3, an uppermost node may be called a root node and have a smallest depth value. Here, the uppermost node may have a depth of level 0 and indicate an initial unit that is not divided.

A lower node having a depth of level 1 may indicate a unit divided once from the initial unit, and a lower node having a depth of level 2 may indicate a unit divided twice from the initial unit. For example, in 320 of FIG. 3, a unit a corresponding to a node a may be a unit divided once from the initial unit and have a depth of level 1.

A leaf node of level 3 may indicate a unit divided three times from the initial unit. For example, in 320 of FIG. 3, a unit d corresponding to a node d may be a unit divided three times from the initial unit and have a depth of level 3. The leaf node of level 3, which is a lowermost node, may have a deepest depth.

As described above, in the case in which the encoder and the decoder perform the inter prediction and/or the motion compensation using the skip mode, the direct mode, the merge mode, the MVP, the AMVP, or the like, they may determine the reference unit among the reconstructed neighboring units and use a motion vector of the determined reference unit. The reconstructed neighboring units adjacent to the encoding/decoding target unit may have different characteristics. For example, the characteristics may be represented by an encoding parameter of each of the reconstructed neighboring units. Therefore, in the case in which the encoder and the decoder determine the reference unit and perform the encoding/decoding, they need to efficiently use the encoding parameter of the picture. In addition, a single picture may include units having various sizes and units having various depths. Therefore, in order to improve encoding/decoding performance, a method for determining a reference unit in consideration of variety of sizes and/or depths of units may be provided.

Figure 4:
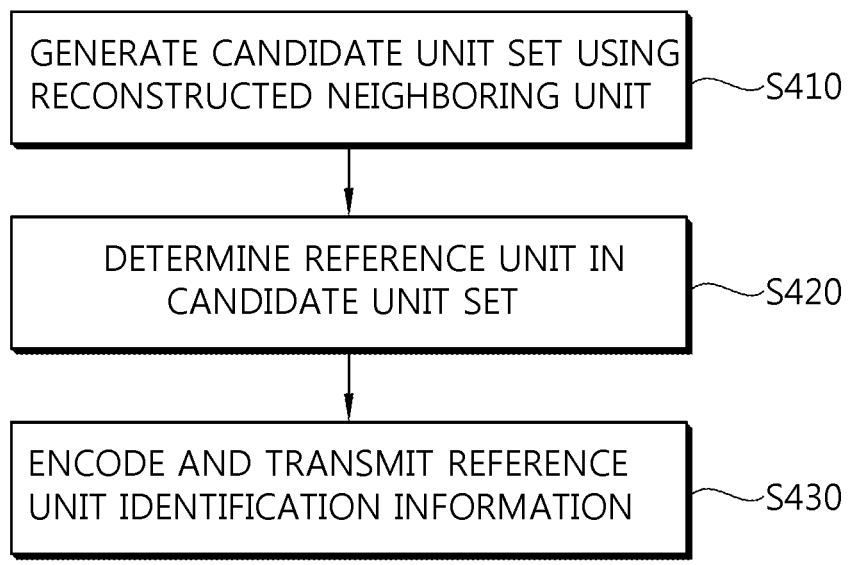
FIG. 4 is a flow chart schematically showing an example of a method for determining a reference unit in an encoder.

FIG. 4 is a flow chart schematically showing an example of a method for determining a reference unit in an encoder.

Referring to FIG. 4, the encoder may generate a candidate unit set using reconstructed neighboring units (S410). Here, the candidate unit set means a set of reference unit candidates. A reference unit used for prediction and/or motion compensation of a current encoding target unit may be determined among the reference unit candidates. Hereinafter, the candidate unit may have the same meaning as that of the reference unit candidate.

The encoder may select candidate units among the reconstructed neighboring units by a predetermined standard and/or method. Here, the encoder may use an encoding parameter of the encoding target unit and encoding parameters of the reconstructed neighboring units in order to reflect characteristics of a picture. The encoder may generate the candidate unit set by allowing the selected candidate units to be included in and/or inserted into the candidate unit set. Specific examples of a method for generating a candidate unit set will be described below.

Again referring to FIG. 4, the encoder may determine a reference unit used for prediction and/or motion compensation of the current encoding target unit among the candidate units included in the generated candidate unit set (S420).

After the reference unit is determined, the encoder may perform inter prediction on the encoding target unit using the determined reference unit. In this case, the encoder may use a method such as the skip mode, the direct mode, the merge mode, the MVP, the AMVP, or the like, in performing the inter prediction and/or the motion compensation. Specific examples of a method for determining a reference unit will be described below.

After the reference unit is determined, the encoder may encode reference unit identification information to transmit the encoded reference unit identification information to the decoder (S430). As the reference unit identification information, there are an encoding parameter identifier, a reference unit identifier, and the like. A specific example of a method for encoding reference unit identification information will be described below.

Figure 5:
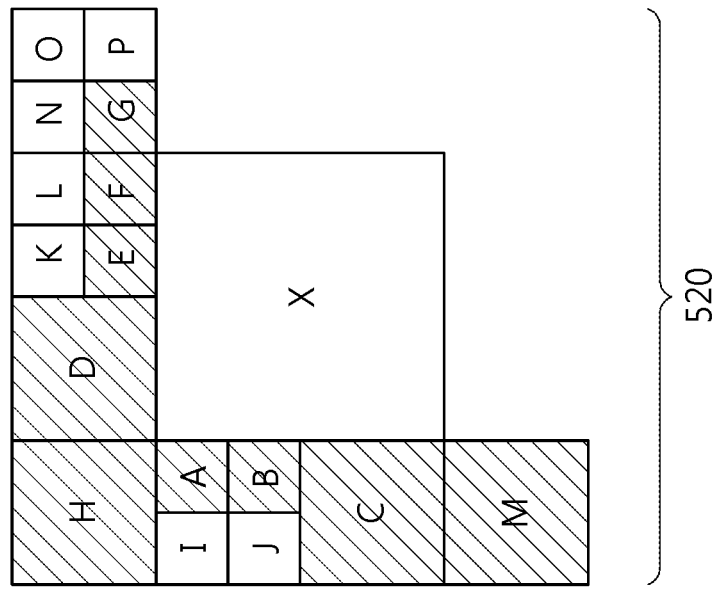
FIG. 5 is a conceptual diagram schematically showing an example of a method for generating a candidate unit set.
Figure 5:
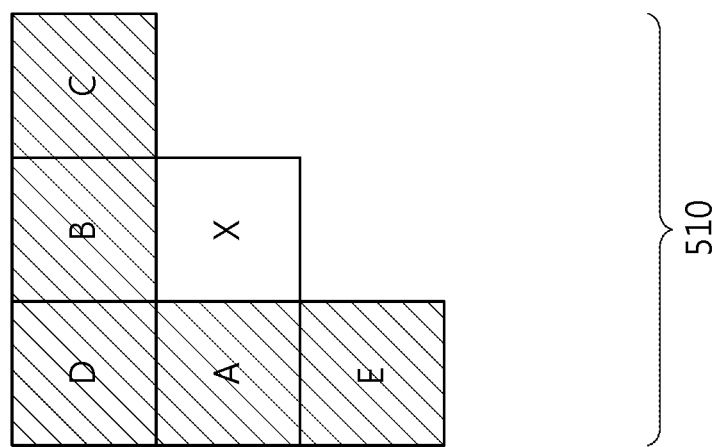

FIG. 5 is a conceptual diagram schematically showing an example of a method for generating a candidate unit set.

The encoder may select units adjacent to an encoding target unit and units positioned at corners of the encoding target unit among reconstructed neighboring units as candidate units and allow the selected candidate units to be included in a candidate unit set. An encoding target unit on which inter prediction and/or motion compensation are performed may be a prediction unit.

Hereinafter, a unit adjacent to an upper portion of the encoding target unit will be called an upper neighboring unit, and a unit adjacent to the left of the encoding target unit will be called a left neighboring unit. In addition, a unit positioned at a right upper corner of the encoding target unit will be called a right upper corner unit, a unit positioned at a left upper corner of the encoding target unit will be called a left upper corner unit, and a unit positioned at a left lower corner of the encoding target unit will be called a left lower corner unit.

Referring to 510 of FIG. 5, the encoder may select a left neighboring unit A, an upper neighboring unit B, a right upper corner unit C, a left upper corner unit D, and a left lower corner unit E as candidate units included in the candidate unit set. In this case, as an example, the generated candidate unit set may be {A, B, C, D, E}.

Referring to 520 of FIG. 5, the encoder may select left neighboring units A, B, and C, upper neighboring units D, E, and F, a right upper corner unit G, a left upper corner unit H, and a left lower corner unit M as candidate units included in the candidate unit set. In this case, as an example, the generated candidate unit set may be {H, D, E, F, G, A, B, C, M}.

In the above-mentioned example, the encoder may also select only a specific unit among the left neighboring units as a candidate unit. For example, the encoder may select only a unit positioned at a lowermost portion among the left neighboring units as a candidate unit. In addition, the encoder may also select only a specific unit among the upper neighboring units as a candidate unit. For example, the encoder may select only a unit positioned at a rightmost portion among the upper neighboring units as a candidate unit. In this case, in 520 of FIG. 5, the generated candidate unit set may be {H, F, G, C, M}.

Figure 6:
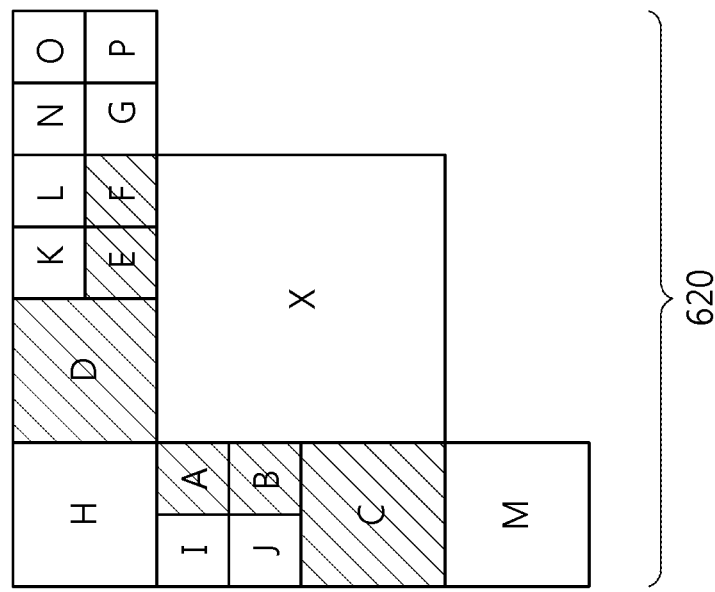
FIG. 6 is a conceptual diagram schematically showing another example of a method for generating a candidate unit set.
Figure 6:
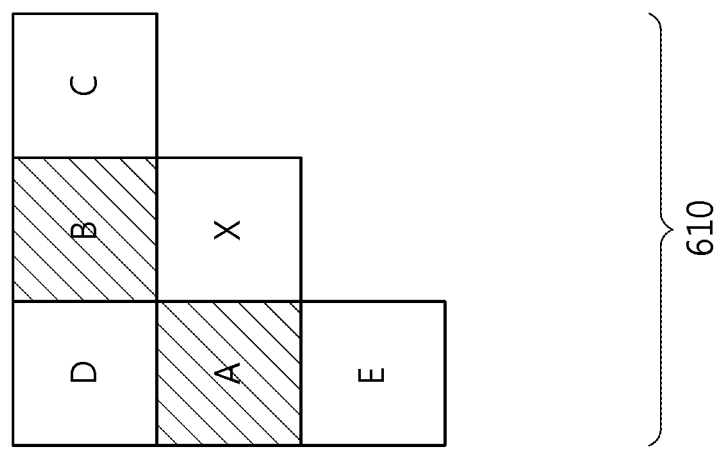

FIG. 6 is a conceptual diagram schematically showing another example of a method for generating a candidate unit set.

The encoder may select units adjacent to the left of an encoding target unit and units adjacent to an upper portion of the encoding target unit among reconstructed neighboring units as candidate units and allow the selected candidate units to be included in a candidate unit set.

Referring to 610 of FIG. 6, the encoder may select a left neighboring unit A and an upper neighboring unit B as candidate units included in the candidate unit set. In this case, as an example, the generated candidate unit set may be {A, B}.

Referring to 620 of FIG. 6, the encoder may select left neighboring units A, B, and C and upper neighboring units D, E, and F as candidate units included in the candidate unit set. In this case, as an example, the generated candidate unit set may be {D, E, F, A, B, C}.

Figure 7:
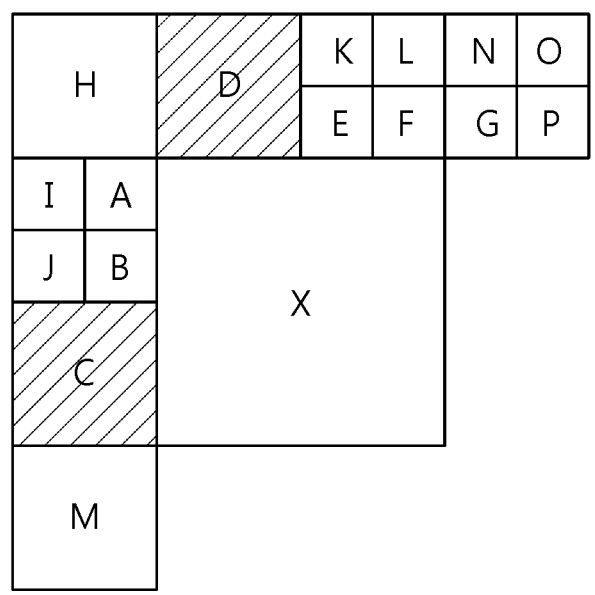
FIG. 7 is a conceptual diagram schematically showing still another example of a method for generating a candidate unit set.

FIG. 7 is a conceptual diagram schematically showing still another example of a method for generating a candidate unit set. In the example of FIG. 7, it is assumed that a size of an encoding target unit X is 16×16, a size of each of units C, D, H, and M is 8×8, and a size of each of remaining units is 4×4.

As described above with reference to FIG. 6, the encoder may select units adjacent to the left of an encoding target unit and units adjacent to an upper portion of the encoding target unit among reconstructed neighboring units as candidate units. In this case, the encoder may also select only units of which lengths of boundaries adjacent to the encoding target unit are a predetermined length or more among the left neighboring units and the upper neighboring units as the candidate units and allow the selected candidate units to be included in the candidate unit set. Here, the predetermined length may be a positive integer. Hereinafter, a boundary in which the encoding target unit and the reconstructed neighboring units are adjacent to each other will be called an adjacent boundary.

Referring to FIG. 7, the encoder may select only units of which lengths of boundaries adjacent to the encoding target unit are 8 or more as the candidate units. Since each of units C and D has a size of 8×8 and a length of boundary in which the encoding target unit and each of the units C and D are adjacent to each other is 8, the units C and D may be selected as the candidate units included in the candidate unit set. On the other hand, since each of units A, B, E, and F has a size of 4×4 and a length of a boundary in which the encoding target unit and each of the units A, B, E, and F are adjacent to each other is 4, the units A, B, E, and F may not be selected as the candidate units included in the candidate unit set. In this case, as an example, the generated candidate unit set may be {C, D}.

As another example, the encoder may also select the candidate units included in the candidate unit set based on relative lengths of adjacent boundaries of the left neighboring units and adjacent boundaries of the upper neighboring units. That is, the encoder may select the candidate units by comparing lengths of adjacent boundaries of units adjacent to the encoding target unit with each other.

For example, in the case in which units having a length of an adjacent boundary of 4 and units having a length of an adjacent boundary of 8 are present among the reconstructed neighboring units, the encoder may allow only the latter units in which a length of an adjacent boundary is relatively long to be included in the candidate unit set. As another example, in the case in which units having a length of an adjacent boundary of 16 and units having a length of an adjacent boundary of 4 are present among the reconstructed neighboring units, the encoder may allow only the latter units in which a length of an adjacent boundary is relatively short to be included in the candidate unit set.

Figure 8:
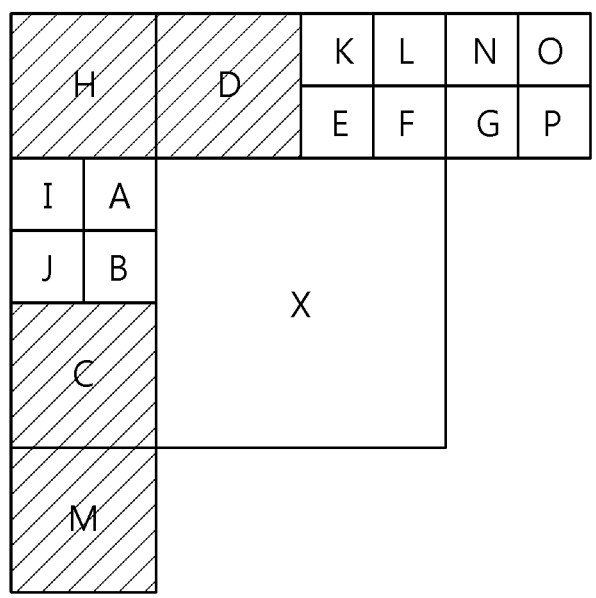
FIG. 8 is a conceptual diagram schematically showing still another example of a method for generating a candidate unit set.

FIG. 8 is a conceptual diagram schematically showing still another example of a method for generating a candidate unit set. In the example of FIG. 8, it is assumed that a size of an encoding target unit X is 16×16, a size of each of units C, D, H, and M is 8×8, and a size of each of remaining units is 4×4.

As described above with reference to FIG. 5, the encoder may select the units adjacent to the encoding target unit and the units positioned at the corner of the encoding target unit among the reconstructed neighboring units as the candidate units. In this case, the encoder may select only units having a size of a predetermined size or more among the units adjacent to the encoding target unit and the units positioned at the corner of the encoding target unit as the candidate units and allow the selected candidate units to be included in the candidate unit set. Here, the predetermined size may be m*n (where m indicates a positive integer and n indicate a positive integer).

Referring to FIG. 8, the encoder may select only units having a size of 8×8 or more as the candidate units. Since each of units C, D, H, and M has a size of 8×8, it may be selected as the candidate unit included in the candidate unit set. On the other hand, since each of units A, B, E, F, and G has a size of 4×4, it may not be selected as the candidate units included in the candidate unit set. In this case, as an example, the generated candidate unit set may be {C, D, H, M}.

As another example, the encoder may also select the candidate units included in the candidate unit set based on relative sizes of the reconstructed neighboring units. That is, the encoder may select the candidate units by comparing the sizes of the reconstructed neighboring units with each other. For example, in the case in which reconstructed neighboring units having a size of 8×8 and reconstructed neighboring units having a size of 16×16 are present, the encoder may allow only the latter units having a relatively large size to be included in the candidate unit set.

Figure 9:
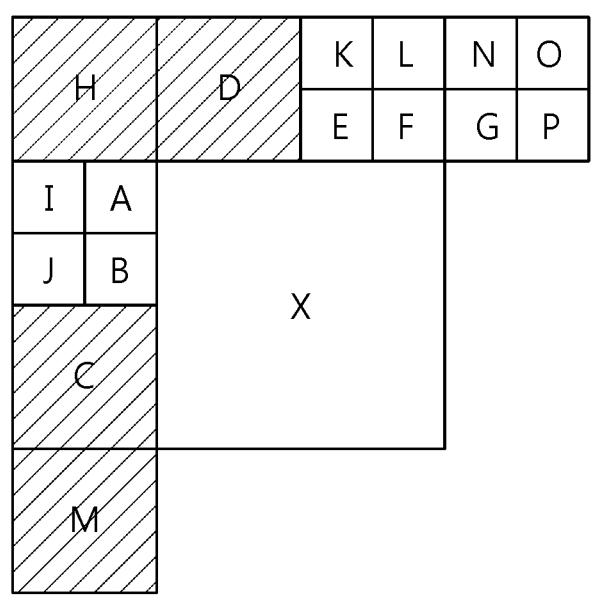
FIG. 9 is a conceptual diagram schematically showing still another example of a method for generating a candidate unit set.

FIG. 9 is a conceptual diagram schematically showing still another example of a method for generating a candidate unit set. In the example of FIG. 9, it is assumed that a depth value of an encoding target unit X is 0, a depth value of each of units C, D, H, and M is 1, and a depth value of each of remaining units is 2.

As described above with reference to FIG. 5, the encoder may select the units adjacent to the encoding target unit and the units positioned at the corner of the encoding target unit among reconstructed neighboring units as the candidate units. In this case, the encoder may select only units having a depth of a predetermined depth or less among the units adjacent to the encoding target unit and the units positioned at the corner of the encoding target unit as the candidate units and allow the selected candidate units to be included in the candidate unit set. Here, the predetermined depth may be n (where n indicates a positive integer).

Referring to FIG. 9, the encoder may select only units having a depth of 1 or less as the candidate units. Since each of units C, D, H, and M has a depth of 1, it may be selected as the candidate unit included in the candidate unit set. On the other hand, since each of units A, B, E, F, and G has a depth of 2, it may not be selected as the candidate units included in the candidate unit set. In this case, as an example, the generated candidate unit set may be {H, D, C, M}.

As another example, the encoder may also select the candidate units included in the candidate unit set based on relative depths of the reconstructed neighboring units. That is, the encoder may select the candidate units by comparing the depths of the reconstructed neighboring units with each other. For example, in the case in which reconstructed neighboring units having a depth of 0 and reconstructed neighboring units having a depth of 2 are present, the encoder may allow only the former units having a relatively small depth value to be included in the candidate unit set.

As another example, the encoder may select the candidate units included in the candidate unit set using an encoding parameter of the encoding target unit and/or encoding parameters of the reconstructed neighboring units. Here, the encoder may select the candidate unit using encoding parameter relevance between the encoding target unit and the reconstructed neighboring units and or select the candidate unit only using the encoding parameters of the reconstructed neighboring units.

As an example, the encoder may also judge whether or not motion information of the reconstructed neighboring units and motion information of the encoding target unit are the same as each other, select only units having the same motion information as that of the encoding target unit among the reconstructed neighboring units as the candidate units, and then allow the selected candidate units to be included in the candidate unit set. For example, the motion information may be at least one of a motion vector, a reference picture list, a reference picture index, a prediction direction, and a motion vector predictor.

As another example, the encoder may also judge whether or not the motion information of the reconstructed neighboring units and the motion information of the encoding target unit are similar to each other, select only units having the motion information similar to that of the encoding target unit among the reconstructed neighboring units as the candidate units, and then allow the selected candidate units to be included in the candidate unit set. For example, the motion information may be at least one of a motion vector, a reference picture list, a reference picture index, a prediction direction, and a motion vector predictor. In the case in which the motion information of the reconstructed neighboring units and the motion information of the encoding target unit satisfy a predetermined standard even though they are not completely the same as each other, it may be judged that they are similar to each other.

Examples of a case in which the motion information of the reconstructed neighboring units and the motion information of the encoding target unit are similar to each other are as follows. For example, in the case in which a difference in size for each component between the motion vector of the reconstructed neighboring units and the motion vector of the encoding target unit is less than a predetermined size in an integer pixel unit, it may be judged that the motion information of the reconstructed neighboring units and the motion information of the encoding target unit are similar to each other. Here, the predetermined size may be any natural number and/or positive real number, for example, 1. As another example, in the case in which the reconstructed neighboring units and the encoding target unit have different reference picture lists but uses the same reference picture, it may be judged that the motion information of the reconstructed neighboring units and the motion information of the encoding target unit are similar to each other. As still another example, in the case in which the reconstructed neighboring units and the encoding target unit have different reference picture indices but uses the same reference picture, it may be judged that the motion information of the reconstructed neighboring units and the motion information of the encoding target unit are similar to each other.

Further, for example, the encoder may not select units encoded by the intra prediction among the reconstructed neighboring units as the candidate units. In this case, the encoder may allow the units encoded by the intra prediction not to be included in the candidate unit set. As an example, the encoder may select only units encoded by the inter prediction among the reconstructed neighboring units as the candidate units and allow the selected candidate units to be included in the candidate unit set.

The encoder may judge whether or not residual signals for the reconstructed neighboring units are present, select units for which the residual signal is not present among the reconstructed neighboring units as the candidate units, and then allow the selected candidate units to be included in the candidate unit set. Here, whether or not the residual signals are present may be determined through values of a coded block pattern (CBP) and/or a coded block flag (CBF), which are syntax elements for whether or not the residual signals are present.

In the examples of the method for generating a candidate unit set described above, the number of candidate units included in the candidate unit set may be limited to a predetermined number (for example, N). Where N may indicate a positive integer larger than 0.

In the case in which the number of candidate units included in the candidate unit set is limited to N, the encoder may select only N units among the reconstructed neighboring units as the candidate units using a predetermined standard. Here, as the predetermined standard, there may be degrees adjacent to the encoding target unit, degrees adjacent to boundaries of the encoding target unit, relative lengths and/or absolute lengths of boundaries adjacent to the encoding target unit, relative sizes and/or absolute sizes of the reconstructed neighboring units, relative depth values and/or absolute depth values of the reconstructed neighboring units, an encoding/decoding sequence of the reconstructed neighboring units, the sameness/similarity between an encoding parameter of the encoding target unit and encoding parameters of the reconstructed neighboring units, and the like. The examples of the case in which the encoding parameters of the reconstructed neighboring units are similar to that of the encoding target unit have been described above. For example, in the case in which the encoding parameters of the reconstructed neighboring units and the encoding parameter of the encoding target unit use the same reference picture, it may be judged that the encoding parameters of the reconstructed neighboring units and the encoding parameter of the encoding target unit are similar to each other.

For example, the number of candidate units included in the candidate unit set may be two. In this case, as an example, the encoder may select two units according to a sequence in which lengths of boundaries adjacent to the encoding target unit are long among the reconstructed neighboring units as the candidate units and allow the selected candidate units to be included in the candidate unit set.

As another example, the number of candidate units included in the candidate unit set may be three. In addition, as an example, the reconstructed neighboring units may have the same motion information. In this case, the encoder may select three units reconstructed late in an encoding/decoding sequence among the reconstructed neighboring units having the same motion information as the candidate units and allow the selected candidate unit to be included in the candidate unit set.

Meanwhile, in the examples of the method for generating a candidate unit set described above, the candidate units included in the candidate unit set may be arranged according to a sequence in which the probabilities that they will be determined as reference units for the encoding target unit are high. That is, the encoder may allow units having high probability to be determined as the reference units for the encoding target unit to be preferentially included in and/or inserted in the candidate unit set. In this case, the encoder may allocate a reference unit identifier having a shorter codeword to the candidate unit having higher probability to be determined as the reference unit, thereby making it possible to raise encoding efficiency.

Figure 10:
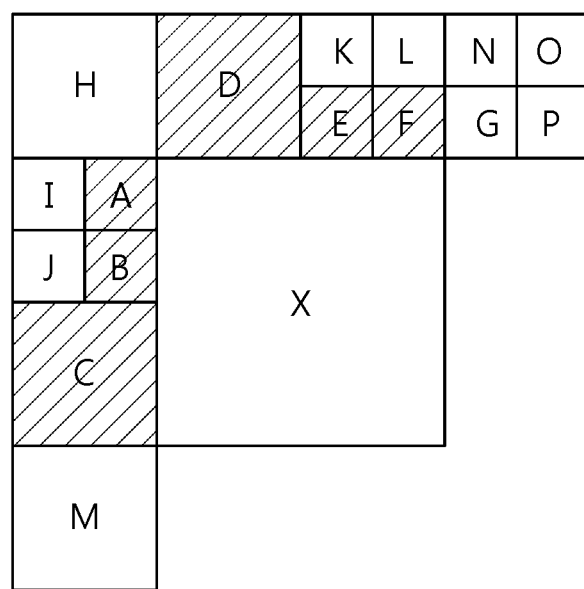
FIG. 10 is a conceptual diagram schematically showing an example of a method for determining a sequence in which candidate units are included in a candidate unit set.

FIG. 10 is a conceptual diagram schematically showing an example of a method for determining a sequence in which candidate units are included in a candidate unit set. In FIG. 10, it is assumed that an encoding/decoding sequence of the reconstructed neighboring units is H→D→K→L→E→F→N→O→G→P→I→A→J→B→C→M.

For example, the encoder may select units adjacent to the left of an encoding target unit and units adjacent to an upper portion of the encoding target unit among reconstructed neighboring units as candidate units and allow the selected candidate units to be included in a candidate unit set. In this case, the encoder may allow the selected candidate units to be included in the candidate unit set according to the encoding/decoding sequence.

Referring to FIG. 10, the encoder may allow candidate units having an early encoding/decoding sequence to be preferentially included in the candidate unit set. Since units adjacent to a current encoding target unit X may be encoded/decoded in a sequence of D→E→F→A→B→C, the generated candidate unit set may be {D, E, F, A, B, C}.

As another example, the encoder may arrange the candidate units included in the candidate unit set according to a sequence in which lengths of boundaries adjacent to the encoding target unit are long. That is, the encoder may allow candidate units of which the lengths of the boundaries adjacent to the encoding target unit are long to be preferentially included in and/or inserted in the candidate unit set.

As another example, the encoder may arrange the candidate units included in the candidate unit set according to a sequence in which depth values are small. That is, the encoder may allow candidate units in which the depth value is small to be preferentially included in and/or inserted in the candidate unit set.

In the examples of the method for generating a candidate unit set described above, the encoder may select the candidate units included in the candidate unit set among the reconstructed neighboring blocks. In this case, the candidate unit selected among the reconstructed neighboring blocks may be called a spatial candidate unit.

The encoder may also select units positioned at the same spatial position as that of the encoding target unit among units in the reference picture, in addition to the spatial candidate units, as the candidate units and allow the selected candidate units to be included in the candidate unit set. Hereinafter, for convenience of explanation, the unit positioned at the same spatial position as that of the encoding target unit among the units in the reference picture will be called a collocated unit and/or a collocated block. In this case, the candidate unit selected among the units in the reference picture may be called a temporal candidate unit.

During a process of generating a candidate unit set described above, the encoder may use encoding parameter identifiers for the reconstructed neighboring units. In this case, the candidate units included in the candidate unit set may be selected using the encoding parameter identifiers. Here, as encoding parameters of which encoding parameter identifiers are used, there may be, for example, lengths of boundaries in which the encoding target unit and the reconstructed neighboring units are adjacent to each other, sizes of the reconstructed neighboring units, depth values of the reconstructed neighboring units, and the like.

A predetermined value may be allocated to the encoding parameter identifier. In this case, as an example, the encoder may select units having an encoding parameter having the same value as a value allocated to the encoding parameter identifier among the reconstructed neighboring units as the candidate units. As another example, the encoder may select units having an encoding parameter having a value larger than the value allocated to the encoding parameter identifier among the reconstructed neighboring units as the candidate units. As still another example, the encoder may also select units having an encoding parameter having a value smaller than the value allocated to the encoding parameter identifier as the candidate units.

For example, it is assumed that the encoding parameter identifiers are used for the lengths of the boundaries in which the encoding target unit and the reconstructed neighboring units are adjacent to each other. Here, the encoding parameter identifier may be represented by log 2_unit_boundary_length. As described above, the encoder may also select only units of which lengths of boundaries adjacent to the encoding target unit is larger than a predetermined length among the reconstructed neighboring units as the candidate units and allow the selected candidate units to be included in the candidate unit set. Here, when it is assumed that the predetermined length is 8, a value of 3 may be allocated to the encoding parameter identifier log 2_unit_boundary_length. In this case, the encoder may select only units having an adjacent boundary length larger than a value allocated to the encoding parameter identifier as the candidate units and allow the selected candidate units to be included in the candidate unit set. In addition, the encoder may encode the encoding parameter identifier to which the value of 3 is allocated and transmit the encoded encoding parameter identifier to the decoder.

When the candidate unit set is generated, the encoder may determine a reference unit used for prediction and/or motion compensation of the current encoding target unit among the candidate units included in the generated candidate unit set.

Figure 11:
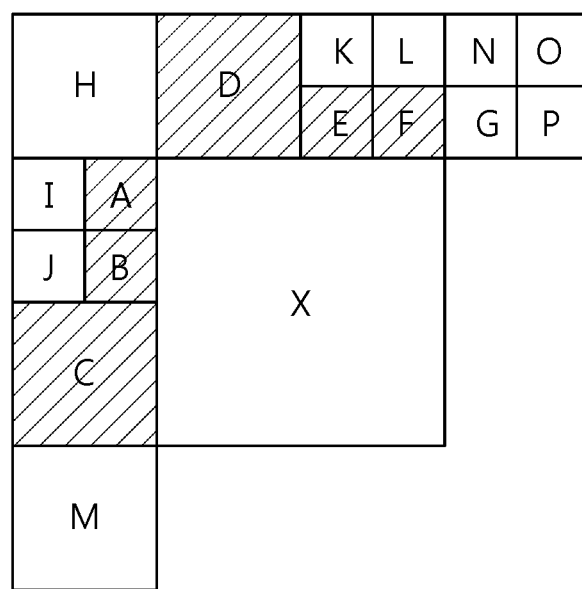
FIG. 11 is a conceptual diagram schematically showing a method for determining a reference unit in an encoder according to an exemplary embodiment of the present invention.

FIG. 11 is a conceptual diagram schematically showing a method for determining a reference unit in an encoder according to an exemplary embodiment of the present invention.

The encoder may determine candidate units indicating optimal encoding efficiency in view of rate-distortion among the candidate units included in the candidate unit set as the reference units. In addition, as described above, the encoder may use the encoding parameters (for example, the motion information, and the like) of the candidate units included in the candidate unit set to perform the inter prediction and the motion compensation. In this case, the encoder may determine the candidate units indicating the optimal encoding efficiency in view of rate-distortion as the reference units using the encoding parameters. Here, a method of selecting an optimal encoding scheme in view of rate and distortion may be called rate distortion optimization (RDO).

When the reference unit is determined in the rate distortion optimization scheme, the encoder may encode a reference unit identifier indicating which of the candidate units included the candidate unit set is determined as the reference unit and transmit the encoded reference unit identifier to the decoder. As an example, the reference unit identifier may indicate a sequence and/or a position of the candidate unit determined as the reference unit in the candidate unit set. As another example, the reference unit identifier may indicate an encoding sequence difference from the encoding target unit to the reference unit. As still another example, each of the candidate units in the candidate unit set may be allocated with reference unit indices, which may be used as the reference unit identifier.

Referring to FIG. 11, the candidate unit set may be {A, B, C, D, E, F} as an example. In this case, each of the candidate units may be allocated with the reference unit index. For example, A may be allocated with 0, B may be allocated with 1, C may be allocated with 2, D may be allocated with 3, E may be allocated with 4, and F may be allocated with 5.

The encoder may encode the reference unit index and transmit the encoded reference unit index to the decoder, and the decoder may receive and decode the encoded reference unit index. In the case in which the encoder determines that the unit B is the reference unit, a value of the reference unit index transmitted to the decoder may be 1. In this case, the decoder may determine that the unit B is the reference unit using the value of the reference unit index.

Figure 12:
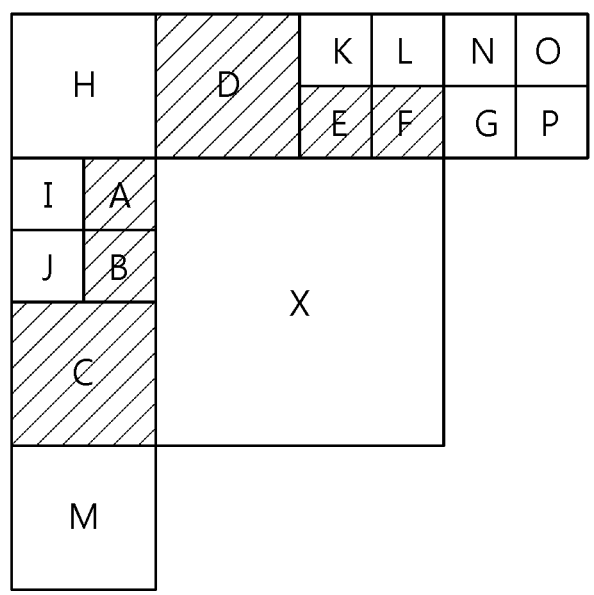
FIG. 12 is a conceptual diagram schematically showing a method for determining a reference unit in an encoder according to another exemplary embodiment of the present invention.

FIG. 12 is a conceptual diagram schematically showing a method for determining a reference unit in an encoder according to another exemplary embodiment of the present invention. In FIG. 12, it is assumed that an encoding/decoding sequence of the reconstructed neighboring units is H→D→K→L→E→F→N→O→G→P→I→A→J→B→C→M.

As described above, during the process of generating a candidate unit set, the encoder may arrange the candidate units included in the candidate unit set according to a sequence in which the probabilities that the candidate units will be determined as the reference units are high. In this case, the encoder may determine a first candidate unit among the candidate units included in the candidate unit set as the reference unit.

Referring to FIG. 12, the encoder may select units adjacent to the encoding target unit as the candidate units. In this case, the selected candidate units may be A, B, C, D, E, and F. The encoder may arrange the selected candidate units according to the encoding/decoding sequence. For example, the encoder may allow units encoded late in the encoding sequence to be preferentially included in the candidate unit set. In this case, the candidate unit set may be {C, B, A, F, E, D}. The encoder may determine a first candidate unit C in the candidate unit set as the reference unit. In this case, a candidate unit having a smallest difference in the encoding sequence from the encoding target unit may be determined as the reference unit.

In the case in which the first candidate unit in the candidate unit set is determined as the reference unit, the encoder and the decoder may determine the reference unit without a separate reference unit identifier. Therefore, the encoder may not encode the reference unit identifier and may not transmit the reference unit identifier to the decoder.

Figure 13:
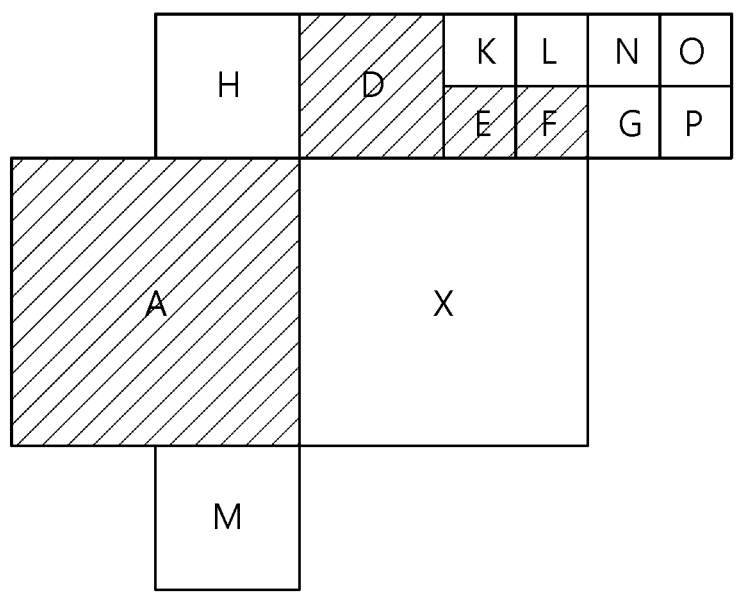
FIG. 13 is a conceptual diagram schematically showing a method for determining a reference unit in an encoder according to still another exemplary embodiment of the present invention.

FIG. 13 is a conceptual diagram schematically showing a method for determining a reference unit in an encoder according to still another exemplary embodiment of the present invention.

Referring to FIG. 13, the encoder may select units adjacent to the encoding target unit as the candidate units. In this case, the selected candidate units may be A, D, E, and F.

Meanwhile, the number of candidate units included in the candidate unit set may be limited to a predetermined number, which may also be 1. In this case, the encoder may select only a single unit having highest probability to be selected as the reference unit among the reconstructed neighboring units as the candidate unit to generate the candidate unit set. For example, the encoder may select only a relatively largest unit (for example, the unit A) as the candidate unit by comparing sizes of the reconstructed neighboring units with each other. In this case, the candidate unit set may be {A}, and the number of candidate units configuring the candidate unit set may be 1.

In the case in which the number of candidate units configuring the candidate unit set is 1, the encoder and the decoder may determine a corresponding candidate unit as the reference unit. In this case, the encoder and the decoder may determine the reference unit without a separate reference unit identifier. Therefore, the encoder may not encode the reference unit identifier and may not transmit the reference unit identifier to the decoder. As described above with reference to FIG. 4, when the reference unit is determined, the encoder may encode the reference unit identification information and transmit the encoded reference unit identification information to the decoder. The reference unit identification information may include at least one of the encoding parameter identifier and the reference unit identifier.

The encoder may use the encoding parameter identifiers for the reconstructed neighboring units. In this case, the candidate units included in the candidate unit set may be selected using the encoding parameter identifiers.

A predetermined value may be allocated to the encoding parameter identifier. In this case, as an example, the encoder may select units having an encoding parameter having the same value as a value allocated to the encoding parameter identifier among the reconstructed neighboring units as the candidate units. As another example, the encoder may select units having an encoding parameter having a value larger than the value allocated to the encoding parameter identifier among the reconstructed neighboring units as the candidate units. As still another example, the encoder may also select units having an encoding parameter having a value smaller than the value allocated to the encoding parameter identifier as the candidate units.

The encoder may encode the encoding parameter identifier. In this case, the encoded encoding parameter identifier may be transmitted to the decoder.

In addition, as described above, the encoder may use the encoding parameters of the candidate units included in the candidate unit set to perform the inter prediction and the motion compensation. In this case, the encoder may determine the candidate units indicating the optimal encoding efficiency in view of rate-distortion as the reference units using the encoding parameters.

When the reference unit is determined in the rate distortion optimization scheme, the encoder may encode a reference unit identifier indicating which of the candidate units included the candidate unit set is determined as the reference unit and transmit the encoded reference unit identifier to the decoder. As an example, the reference unit identifier may indicate a sequence and/or a position of the candidate unit determined as the reference unit in the candidate unit set. As another example, the reference unit identifier may indicate an encoding sequence difference from the encoding target unit to the reference unit. As still another example, each of the candidate units in the candidate unit set may be allocated with reference unit indices, which may be used as the reference unit identifier.

The decoder may receive and decode the encoded reference unit identifier. The decoder may determine the reference unit using the decoded reference unit identifier.

In the case in which the first candidate unit in the candidate unit set is determined as the reference unit and the number of candidate units configuring the candidate unit set is 1, the encoder and the decoder may determine the reference unit without a separate reference unit identifier. In this case, the encoder may also omit the encoding of the reference unit identifier.

Figure 14:
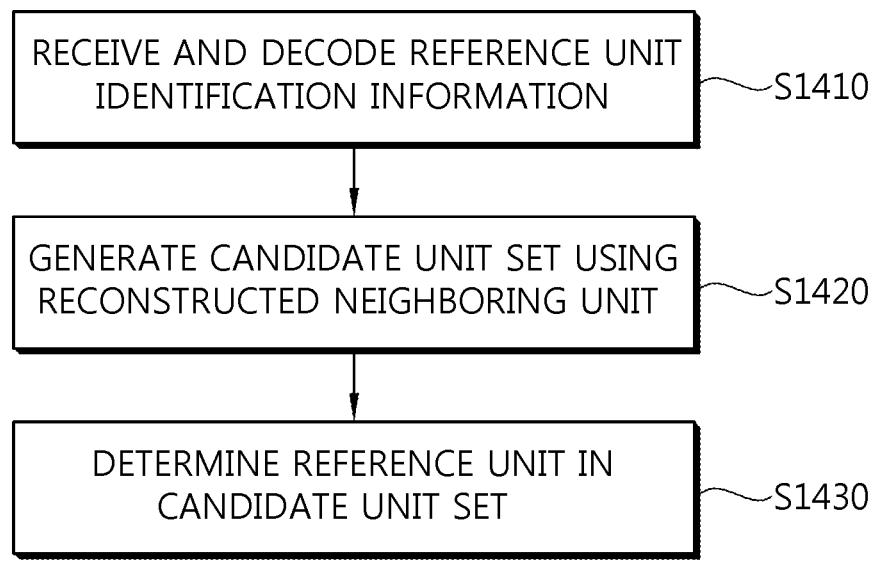
FIG. 14 is a flow chart schematically showing an example of a method for determining a reference unit in a decoder.

FIG. 14 is a flow chart schematically showing an example of a method for determining a reference unit in a decoder.

Referring to FIG. 14, the decoder may receive the reference unit identification information from the encoder and decode the received reference unit identification information (S1410). The reference unit identification information transmitted from the encoder may include at least one of the encoding parameter identifier and the reference unit identifier.

The decoder may select the candidate units included in the candidate unit set using the encoding parameter identifier included in the reference unit identification information. A predetermined value may be allocated to the encoding parameter identifier. In this case, as an example, the decoder may select units having an encoding parameter having the same value as a value allocated to the encoding parameter identifier among the reconstructed neighboring units as the candidate units. As another example, the decoder may select units having an encoding parameter having a value larger than the value allocated to the encoding parameter identifier among the reconstructed neighboring units as the candidate units. As still another example, the decoder may also select units having an encoding parameter having a value smaller than the value allocated to the encoding parameter identifier as the candidate units. Here, the value allocated to the encoding parameter identifier may be the same value as that of the encoding parameter and/or the encoding parameter identifier used in the encoder.

The decoder may decode the reference unit identifier encoded in the encoder. As described above, the reference unit identifier may indicate which of the candidate units included in the candidate unit set is determined as the reference unit. As an example, the reference unit identifier may indicate a sequence and/or a position of the candidate unit determined as the reference unit in the candidate unit set. As another example, the reference unit identifier may indicate a decoding sequence difference from a decoding target unit to the reference unit. As still another example, each of the candidate units in the candidate unit set may be allocated with reference unit indices, which may be used as the reference unit identifier. The decoder may use the decoded reference unit identifier in determining the reference unit in the candidate unit set.

In the case in which the first candidate unit in the candidate unit set is determined as the reference unit and the number of candidate units configuring the candidate unit set is 1, the encoder and the decoder may determine the reference unit without a separate reference unit identifier. In this case, since the encoder may not transmit the reference unit identifier, the decoder may not decode the reference unit identifier.

Referring to FIG. 14, the decoder may generate the candidate unit set using the reconstructed neighboring units (S1420).

The decoder may select candidate units among the reconstructed neighboring units by a predetermined standard and/or method. Here, the decoder may use an encoding parameter of the decoding target unit and encoding parameters of the reconstructed neighboring units in order to reflect characteristics of the picture. The decoder may generate the candidate unit set by allowing the selected candidate units to be included in and/or inserted into the candidate unit set.

The decoder may generate the candidate unit set through the same process as the process in the encoder. Since the process of generating a candidate unit set in the encoder has be described above, a detailed description of a process of generating a candidate unit set in the decoder will be omitted.

When the candidate unit set is generated, the decoder may determine a reference unit used for prediction and/or motion compensation of a current decoding target unit among the candidate units included in the generated candidate unit set (S1430).

The decoder may use the decoded reference unit identification information during a process of determining the reference unit. After the reference unit is determined, the decoder may perform inter prediction on the decoding target unit using the determined reference unit. Specific examples of a method for determining a reference unit will be described below.

Figure 15:
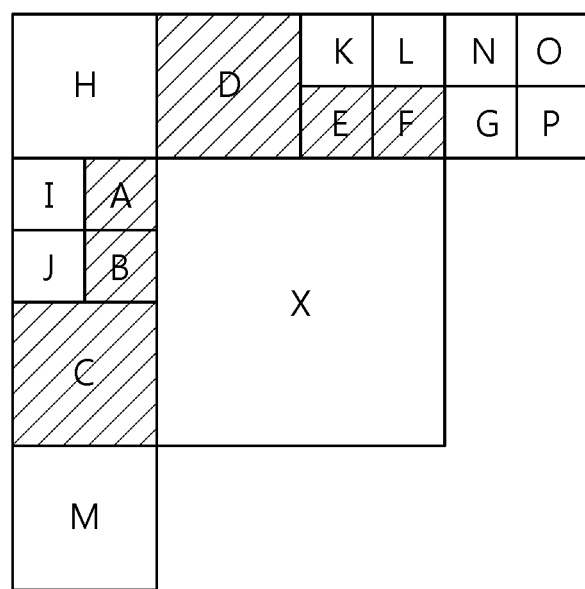
FIG. 15 is a conceptual diagram schematically showing a method for determining a reference unit in a decoder according to an exemplary embodiment of the present invention.

FIG. 15 is a conceptual diagram schematically showing a method for determining a reference unit in a decoder according to an exemplary embodiment of the present invention.

The decoder may determine the reference unit used for inter prediction and motion compensation of the decoding target unit among the candidate units included in the candidate unit set using the decoded reference unit identifier. As an example, the reference unit identifier may indicate a sequence and/or a position of the candidate unit determined as the reference unit in the candidate unit set. As another example, the reference unit identifier may indicate a decoding sequence difference from a decoding target unit to the reference unit. As still another example, each of the candidate units in the candidate unit set may be allocated with reference unit indices, which may be used as the reference unit identifier.

Referring to FIG. 15, the candidate unit set may be {A, B, C, D, E, F} as an example. In this case, each of the candidate units may be allocated with the reference unit index. For example, A may be allocated with 0, B may be allocated with 1, C may be allocated with 2, D may be allocated with 3, E may be allocated with 4, and F may be allocated with 5. In the case in which a value of the decoded reference unit index is 2, the decoder may determine the unit C as the reference unit using the value of the reference unit index.

Figure 16:
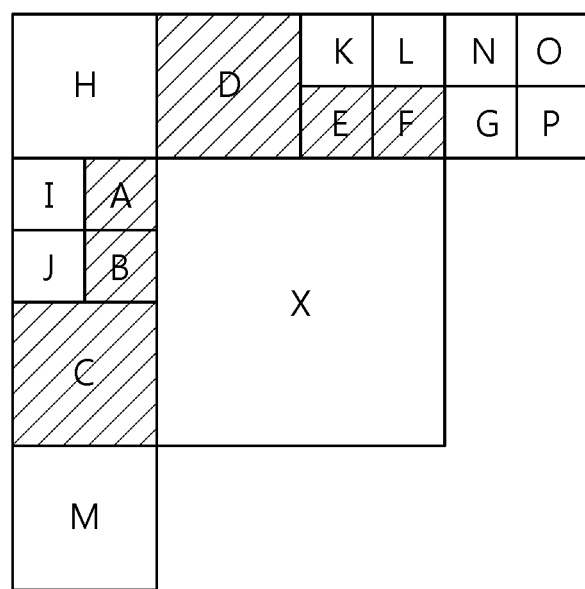
FIG. 16 is a conceptual diagram schematically showing a method for determining a reference unit in a decoder according to another exemplary embodiment of the present invention.

FIG. 16 is a conceptual diagram schematically showing a method for determining a reference unit in a decoder according to another exemplary embodiment of the present invention. In FIG. 16, it is assumed that a decoding sequence of the reconstructed neighboring units is H→D→K→L→E→F→N→O→G→P→I→A→J→B→C→M.

During the process of generating a candidate unit set, the decoder may arrange the candidate units included in the candidate unit set according to a sequence in which the probabilities that the candidate units will be determined as the reference unit are high. In this case, the decoder may determine a first candidate unit among the candidate units included in the candidate unit set as the reference unit.

Referring to FIG. 16, the decoder may select units adjacent to the decoding target unit as the candidate units. In this case, the selected candidate units may be A, B, C, D, E, and F. The decoder may arrange the selected candidate units according to the decoding sequence. For example, the decoder may allow units decoded late in the decoding sequence to be preferentially included in the candidate unit set. In this case, the candidate unit set may be {C, B, A, F, E, D}. The decoder may determine a first candidate unit C in the candidate unit set as the reference unit. In this case, a candidate unit having a smallest difference in the decoding sequence from the decoding target unit may be determined as the reference unit.

In the case in which the first candidate unit in the candidate unit set is determined as the reference unit, the encoder and the decoder may determine the reference unit without a separate reference unit identifier. In this case, since the encoder may not transmit the reference unit identifier to the decoder, the decoder may not decode the reference unit identifier.

Figure 17:
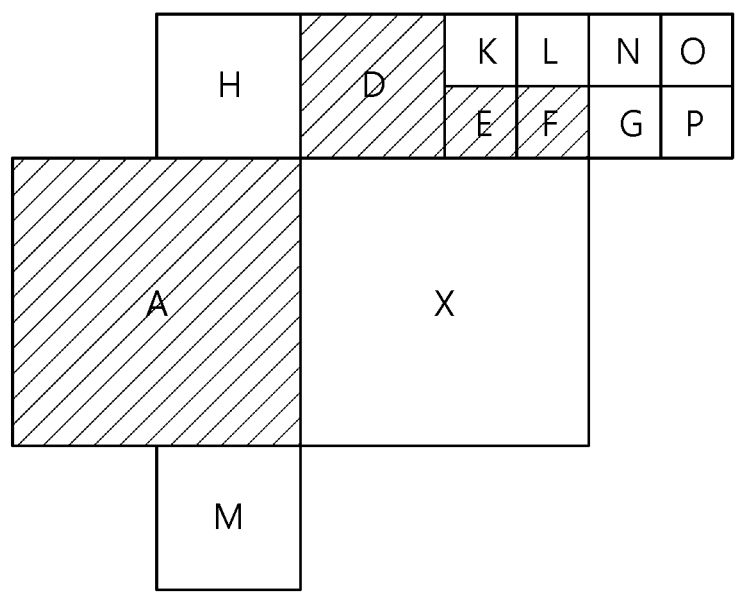
FIG. 17 is a conceptual diagram schematically showing a method for determining a reference unit in a decoder according to still another exemplary embodiment of the present invention.

FIG. 17 is a conceptual diagram schematically showing a method for determining a reference unit in a decoder according to still another exemplary embodiment of the present invention.

Referring to FIG. 17, the decoder may select units adjacent to the decoding target unit as the candidate units. In this case, the selected candidate units may be A, D, E, and F.

Meanwhile, the number of candidate units included in the candidate unit set may be limited to a predetermined number, which may also be 1. In this case, the decoder may select only a single unit having highest probability to be selected as the reference unit among the reconstructed neighboring units as the candidate unit to generate the candidate unit set. For example, the decoder may select only a relatively largest unit (for example, the unit A) as the candidate unit by comparing sizes of the reconstructed neighboring units with each other. In this case, the candidate unit set may be {A}, and the number of candidate units configuring the candidate unit set may be 1.

In the case in which the number of candidate units configuring the candidate unit set is 1, the encoder and the decoder may determine a corresponding candidate unit as the reference unit. In this case, the encoder and the decoder may determine the reference unit without a separate reference unit identifier. Therefore, since the encoder may not transmit the reference unit identifier to the decoder, the decoder may not decode the reference unit identifier.

In the above-mentioned exemplary embodiments, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:

1. A method for decoding a video signal, the method comprising:
    selecting candidate units among reconstructed neighboring units adjacent to a decoding target unit;
    generating a candidate unit set for the decoding target unit based on the selected candidate units;
    deriving motion information of the decoding target unit based on the generated candidate unit set; and
    obtaining a prediction block of the decoding target unit based on the derived motion information,
    wherein the step of selecting candidate units selects units, which have a reference picture list different from a reference picture list of the decoding target unit and use the same reference picture as the decoding target unit, among the reconstructed neighboring units, and
    wherein the step of selecting candidate units further comprises selecting candidate units coded by an inter prediction among the reconstructed neighboring units as the candidate unit.

2. A method for encoding a video signal, the method comprising:
    selecting candidate units among reconstructed neighboring units adjacent to the encoding target unit;
    generating a candidate unit set for the encoding target unit based on the selected candidate unit; and
    encoding an encoding parameter to specify, from the candidate unit set, a motion vector of a reference unit which is used for inter prediction of the encoding target unit,
    wherein the step of selecting candidate units selects units, which have a reference picture list different from a reference picture list of the encoding target unit and use the same reference picture as the encoding target unit, among the reconstructed neighboring units, and
    wherein the step of selecting candidate units further comprises selecting candidate units coded by an inter prediction among the reconstructed neighboring units as the candidate unit.

3. A non-transitory recording medium storing a bitstream formed by a method for encoding a video signal, the method comprising:

selecting candidate units among reconstructed neighboring units adjacent to the encoding target unit;

generating a candidate unit set for the encoding target unit based on the selected candidate unit; and encoding an encoding parameter to specify, from the candidate unit set, a motion vector of a reference unit which is used for inter prediction of the encoding target unit, wherein the step of selecting candidate units selects units, which have a reference picture list different from a reference picture list of the encoding target unit and use the same reference picture as the encoding target unit, among the reconstructed neighboring units, and wherein the step of selecting candidate units further comprises selecting candidate units coded by an inter prediction among the reconstructed neighboring units as the candidate unit.

\* \* \* \* \*